United States Patent Office 2,824,080
Patented Feb. 18, 1958

2,824,080

MIXTURES OF HYDROXY PHENONES AND ESTERS OF SALICYLIC ACID IN RESINS AS INHIBITORS OF DISCOLORATION BY LIGHT

Elmer H. Haux, Pittsburgh, Pa., assignor to Pittsburgh Plate Glass Company, Allegheny County, Pa., a corporation of Pennsylvania No Drawing. Application March 1, 1954
Serial No. 413,467

6 Claims. (Cl. 260—45.4)

This invention relates to interpolymers of (A) polyesters of dicarboxylic acids and dihydric alcohols and (B) monomers which are soluble in, or compatible with said polyesters and which contain a >C=CH₂ group. The invention has particular relation to interpolymerizable mixtures of the foregoing type, or the products of interpolymerization derived therefrom, which have a relatively high resistance to discoloration upon aging.

A very common resinifiable composition enjoying an extensive and a rapidly increasing popularity in the resin field comprises a mixture of (A) a polyester of an alpha-beta ethylenically unsaturated dicarboxylic acid such as maleic or fumaric acid and a dihydric alcohol or glycol such as propylene glycol or diethylene glycol and (B) a monomer such as styrene, vinyl acetate, vinyl toluene, diallyl phthalate, or the like. These monomers all contain a terminal >C=CH₂ group, preferably attached to a negative radical and are compatible with and interpolymerizable with said polyester. These interpolymerizable mixtures are liquid and can readily be poured into molds or spread upon, or impregnated into woven fabrics and mats, bats and papers of fibers of various types. The mixtures when so applied can be easily cured by heating or baking operations in the absence of, or substantial absence of externally applied pressures, thus forming hard and strong reinforced bodies containing the resins as bonding agents and being of high utility. These bodies, in the absence of added opacifying materials or coloring matters such as pigment or other fillers and reinforcing agents, are clear and initially of but little or no color. For these reasons, they are of exceptional merit for the manufacture of articles such as transparent sheets, airplane canopies, windows and the like. They are also useful in forming reinforced sheets and laminates.

While these products are highly serviceable and enjoy extensive and growing use, they are sometimes characterized by a slight tendency to undergo discoloration or yellowing upon aging, especially if such aging includes exposure to ultra-violet irradiation. In order to reduce this tendency of the foregoing interpolymerizable mixtures to discolor, it has heretofore been suggested to incorporate into the mixtures prior to the curing operation, certain compounds termed "light stabilizers," which have a capacity for reducing the tendency of the materials to discolor upon aging, but which in other respects do not substantially affect the properties of the materials.

Among the more satisfactory materials for this purpose may be listed salicylic acid esters containing a hydrocarbon group connected to

by an oxygen (—O—) bridge and represented by:

Phenyl salicylate
Methyl salicylate
Ethyl salicylate
Diisopropylene glycol salicylate
Isopropyl salicylate
Isoamyl salicylate
Isobutyl salicylate Of the several salicylic acid esters, phenyl salicylate has been found to be particularly satisfactory.

Still another class of compounds which strongly reduces the tendency of the previously described interpolymerizable mixtures to discolor upon aging under the influence of ultra-violet light includes hydroxy substituted phenones, preferably those containing the moiety

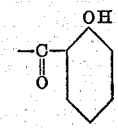

The following constitutes a partial list of such compounds:

Ortho-hydroxy acetophenone
2,4-dihydroxy benzophenone
2,2'-dihydroxy benzophenone
Dihydroxy-acetophenone Of these several hydroxy substituted phenone compounds, ortho-hydroxy acetophenone is presently regarded as being one of the most effective.

It is a characteristic both of the phenyl salicylate esters and the hydroxy substituted phenone compounds that there is a maximum quantity of the compound which can be effectively added to the interpolymerizable mixtures. If an amount beyond this maximum of either type of compound is added, the excess either produces no added inhibitory action against discoloration, or else it actually tends itself to produce discoloration. Thus phenyl salicylate can be added in an amount up to about 2.0 percent based upon the polyester component. Further additions substantially beyond this amount appear to be ineffective. Although it has not been definitely established, it is probable that excessive additions may ultimately lead to a reduction in the physical quality of the product.

If the amount of hydroxy substituted phenone compound is increased unduly, discoloration often results, owing to the presence of excessive amounts of the phenone compound. For example, in the instance of 2,4'-dihydroxy benzophenone, if the amount is increased substantially beyond about 0.1 percent, discoloration of the product may result. This is due at least in part to the fact that the phenone compounds are in many instances slightly yellow in color.

The present invention is based upon the surprising discovery that mixtures of the two foregoing types of inhibitors of discoloration, namely, mixtures of (A) the esters of salicylic acid and (B) the hydroxy substituted phenones are substantially more effective in the stabilization against discoloration of the resins resulting from interpolymerization of the previously described polyesters and the monomers than are either the salicylic acid esters, or the hydroxy substituted phenones taken singly. It is thus possible to prepare resinous products which upon exposure to ultra-violet irradiation are more resistant to discoloration than any corresponding products which can be obtained by the use of either type of discoloration inhibitor taken singly.

The interpolymerizable mixtures with which the combination of salicylic acid ester and hydroxy substituted phenone may be used in order to attain products of greatly increased light stability comprise a relatively large and well-known class. The base component usually comprises, as previously indicated, a polyester of a glycol such as diethylene glycol, propylene glycol or polyethylene glycol and one, or a plurality of polycarboxylic acids, preferably dicarboxylic acids, at least some of which embody an ethylenic group in alpha-beta relationship with respect to at least one of the carboxyls. The presently preferred acids of this type comprise maleic acid and fumaric acid as the acids containing alpha-beta ethylenic unsaturation. However, the invention includes the use of many other acids containing the group

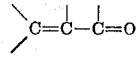

Numerous polyesters and the methods of preparing the same are discussed in prior Patent 2,593,787 to Earl E. Parker. As indicated in the patent, the polyester components may and as a matter of fact, usually do contain a dicarboxylic acid component which is free of ethylenic unsaturation, or other types of reactive unsaturation which react by addition with >C=CH₂ groups. Examples of such acids are phthalic acid, terephthalic acid, or the standard aliphatic dicarboxylic acids of the class represented by succinic acid, adipic acid, sebacic acid, azelaic acid, and the like. The invention also includes the use of dicarboxylic acids of the foregoing types in which one or more of the hydrogens of the benzene rings or hydrocarbon chains are replaced by halogen atoms such as chlorine, or by methyl or ethyl groups, or other non-functioning groups. The acids of this group may be represented by the formula:

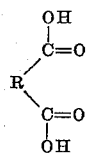

where R is preferably of the class consisting of phenylene, but may also be substituted by nonfunctioning groups as above described. The proportion of saturated or non-ethylenic acids, if such acids are employed, may vary over a broad range, e. g., 0.25 to 12 moles per mole of ethylenically unsaturated acids.

The preparation of the polyesters have now been well conventionalized and many of them constitute well recognized commercial products. Accordingly, the preparation of a polyester component suitable for use in the practice of this invention does not require extensive elaboration. It is sufficient to state that the polyetser can readily be prepared by heating a mixture of a dihydric alcohol such as propylene glycol, or diethylene glycol with the dicarboxylic acid or mixture of such dicarboxylic acids in the presence of, or absence of a catalyst of esterification such as litharge or an aromatic sulfonic acid. Usually, the reaction is conducted under an inert atmosphere such as an atmosphere of carbon dioxide or nitrogen. A small amount of a solvent medium such as xylene or toluene may be included. This solvent may be subjected to a reflux distillation, in which case, it operates azeotropically to remove water of reaction which can be condensed, separated mechanically from the solvent medium and the latter can be returned to the reaction mixture.

The temperature of reaction normally is such as will produce esterification reaction at a reasonable rate, as can readily be determined by the evolution of water from the system. A temperature of about 100° C. to 250° C. is quite effective. The reaction is continued until a polyester having an acid value in a reasonable range, e. g., 3 to about 50 or 60 is obtained. The polyester will usually be a very viscous or even solid product at normal atmospheric temperatures. The reaction usually is completed in a period of about 2 to 20 hours. In no event should the reaction be continued so long as to produce an infusible, insoluble polyester product.

In conducting the reaction, the polyhydric alcohol component is employed in stoichiometric, or in slightly higher proportion (5.0 to 10.0 percent molar excess) with respect to the sum of the carboxylic acid components.

Representative polyesters, prepared by the foregoing or other methods, which may be employed in the practice of the invention, include the following:

TABLE A (A) Polyesters of single acids and glycols, e. g., (1) Maleic polyester of ethylene glycol
(2) Fumaric polyester of ethylene glycol
(3) Itaconic polyester of ethylene glycol
(4) Citraconic polyester of ethylene glycol
(5) Methylene malonic polyester of ethylene glycol
(6) Maleic polyester of propylene glycol
(7) Fumaric polyester of propylene glycol
(8) Maleic polyester of diethylene glycol
(9) Fumaric polyester of diethylene glycol (B) Mixed polyesters of glycols and mixtures of ethylenic dicarboxylic acids and non-ethylenic dicarboxylic acids, such as:

(10) Ethylene glycol polyesters of mixtures of maleic acid and phthalic acid
(11) Ethylene glycol polyesters of mixtures of fumaric acid and phthalic acid
(12) Propylene glycol polyesters of mixtures of maleic acid and phthalic acid
(13) Propylene glycol polyester of mixtures of fumaric acid and phthalic acid
(14) Propylene glycol polyesters of mixtures of maleic acid and adipic acid
(15) Propylene glycol polyesters of mixtures of maleic acid and sebacic acid
(16) Diethylene glycol polyesters of mixtures of maleic acid and phthalic acid
(17) Diethylene glycol polyesters of mixtures of fumaric acid and phthalic acid
(18) Diethylene glycol polyesters of mixtures of maleic acid and adipic acid
(19) Propylene plycol polyesters of mixtures of maleic acid and tetrachlorophthalic acid Monomers suitable for use to provide an interpolymerizable mixture in accordance with the provisions of this invention are disclosed in the foregoing patent to Earl E. Parker. Preferred monomers are liquids containing a >C=CH₂ group attached to a negative radical and which are soluble in, or compatible with the polyester component.

Styrene and similar materials possessing a >C=CH₂ group in a side chain attached to a benzene ring constitute an especially important class of monomers but esters and halides and other derivatives containing terminal >C=CH₂ groups (preferably attached to a negative group) are also effective for some applications. Included among the more common monomers are the following:

TABLE B (1) Styrene
(2) Alpha-methyl styrene
(3) p-Methyl styrene
(4) Divinyl benzene
(5) Vinyl toluene Unsaturated esters such as:

(6) Vinyl acetate
(7) Methyl methacrylate
(8) Methyl acrylate
(9) Allyl acetate
(10) Diallyl phthalate
(11) Diallyl succinate
(12) Diallyl adipate
(13) Diallyl sebacate
(14) Diethylene glycol bis (allyl carbonate)
(15) Triallyl phosphate
(16) Vinyl chloride
(17) Triallyl cyanurate In addition to the above compounds, other monomers may also be utilized, for example halogenated monoolefinic hydrocarbons, that is, monomers containing carbon, hydrogen and one or more halogen atoms, such as alpha-chlorostyrene, vinyl chloride and vinylidene chloride; organic nitriles such as acrylonitrile; acid monomers such as acrylic acid; and amide such as acrylamide. Mixtures of two or more monomers may also be employed.

The preferred monomers are liquid compounds soluble in the polyester component. They will contain the $>C=CH_2$ group and preferably the latter will be attached to a negative radical such as a benzene ring, a chlorine atom, an ester linkage, a nitrile group or the like. They should preferably be free of carbon-carbon conjugated double bonds.

The monomer component or components may be employed over a relatively broad range, but usually, the proportion thereof upon a weight basis will be less than the polyester component. Usually, the percentage of monomer will fall within a range of about 10 to 45 or 50 percent by weight of the total mixture of polyester and monomer. The preferred range of monomer is about 20 to 40 percent, in most instances.

Since the polyester component is usually highly viscous or even solid at normal atmospheric temperatures, it is preferred to add the monomer to the polyester when the latter is heated to or above the fusion temperature. Normally, the temperature of addition of monomer will be above 100° C. and may conveniently be at a temperature of about 120° C. At these temperatures the system is relatively fluid and the several components can readily be incorporated into each other to provide a homogenous solution. At these temperatures, it is also manifest that the polyester and the monomer are highly reactive, even in the absence of catalysts of addition reaction, such as benzoyl peroxide or other free radical initiators. Accordingly, it is preferred to effect the mixing operation while one or both of the components contains a gelation inhibitor such as one or a plurality of the quaternary ammonium compounds selected from the following list disclosed in the foregoing patent to Earl E. Parker.

TABLE C

Trimethyl benzyl ammonium acetate
Trimethyl benzyl ammonium chloride
Trimethyl benzyl ammonium bromide
Triethyl benzyl ammonium chloride
Tripropyl benzyl ammonium chloride
Tributyl benzyl ammonium chloride
Cetyl trimethyl ammonium chloride
Octadecyl trimethyl ammonium chloride
Trimethyl benzyl ammonium chloride
Lauroyl pyridinium chloride
Phenyl trimethyl ammonium chloride
Tolyl trimethyl ammonium chloride
Benzyl trimethyl ammonium phosphate
Benzyl trimethyl ammonium iodide
Ethyl pyridinium chloride
Phenyl trimethyl ammonium chloride
Octyl trimethyl ammonium bromide
Ethylene bis(pyridinium chloride)
Ethylene bis(trimethyl ammonium bromide)
Trimethyl benzyl ammonium oxalate
Trimethyl benzyl ammonium maleate
Trimethyl benzyl ammonium tartrate
Trimethyl benzyl ammonium lactate
Trimethyl benzyl ammonium chloride
Diisobutyl-phenoxy-ethoxy-ethyl dimethyl benzyl ammonium chloride
(B-hydroxyethyl)trimethyl ammonium chloride Other inhibitors which may be so used, include phenolic compounds such as:

TABLE D

Hydroquinone
p-Benzoquinone
Tertiary butyl catechol
3-isopropyl catechol
4-isopropyl catechol
Chloranil
Quinone
Chlorohydroquinone
Dichlorohydroquinone and others Mixtures of two or more inhibitors of gelation and notably mixtures of the quaternary salts first listed with a phenolic compound may be used.

These inhibitors may be employed in amounts effective to prevent premature gelation to a reasonable degree. Excesses may be employed, but naturally they increase both costs and curing time. Effective amounts, of course, would depend upon the reactivity of the polyester-monomer systems, the potentcy of the inhibitor and like factors. Usually the inhibitor need not be employed in an amount in excess of about 1.0 percent by weight based on the interpolymerizable components employed and may be as low as about 0.001 percent by weight upon a like basis. Amounts which are optimum naturally vary, dependent upon the gelation inhibitor and the composition of the interpolymerizable mixture.

It will be appreciated that one or both components of the pairs of inhibitors of discoloration herein disclosed, themselves often have some effect as inhibitors of gelation and for that reason, it is sometimes permissible to reduce the proportion of the conventional gelation inhibitor in the interpolymerizable mixture substantially below the amount which would be required in the absence of the pairs of inhibitors of discoloration.

The mixture of inhibitors or stabilizers against discoloration by light, e. g., a mixture of salicylic acid ester and an ortho-hydroxyphenone may be added to the interpolymerizable mixture at the time the latter is formulated, or it may be added to a component such as the polyester component before the addition of the monomer. The salicylic acid ester component of the stabilizer or inhibitor pair is soluble in the interpolymerizable mixture or the polyester component even at normal room temperatures and may be added to the alkyd-monomer mixture at any stage of preparation or storage before the mixture is actually subjected to the interpolymerization reaction.

However, some of the hydroxy substituted phenones such as 2,4-dihydroxy benzophenone are less soluble in the interpolymerizable mixture or the components thereof at low temperatures and accordingly it is usually preferred to add this component to the interpolymerizable mixture or a component thereof at a higher temperature, e. g., at a temperature in the range of about 75° C. to 150° C., particularly about 140° C. Both inhibitors of discoloration may be added together, or they may be added separately.

In selecting the proportions of the salicylic acid ester and hydroxy substituted phenone compound required to impart a desired degree of resistance to discoloration under ultra-violet irradiation to the products of interpolymerization, due regard should be given to the degree of stability required. Also, it will be apparent that in most cases, the products of interpolymerization, because of the differences in the components thereof, may vary in their tendency to become discolored. Some interpolymerizable mixtures are less subject to discoloration than others. Usually an adequate degree of light stability in the interpolymerizable products can be obtained by the incorporation of about 0.1 to 2.0 or 3.0 percent by weight based upon the interpolymerizable mixture of the salicylic acid ester and about 0.01 to 1.0 or 2.0 percent by weight based upon the same standard of hydroxy substituted phenone compound. If maximum stability is to be attained, the amount of the stabilizers should be near the maximum which will show an increase of stability of the interpolymerizable mixture or which is permissible without discoloring the mixture through dye action. If maximum freedom from color is not required, these proportions may be widely departed from for one or both members of the pair.

Interpolymerizable mixtures of polyesters and monomers containing appropriate amounts of the stabilizer pairs as herein disclosed can be stored for use as desired. It is also permissible and sometimes preferred to add the stabilizer pair or pairs of this invention to the interpolymerizable mixtures at a stage shortly prior to the final cure.

When the mixture is to be employed in the preparation of castings, laminates, or similar articles, it is preferred to add a catalyst of the free radical polymerization type such as:

TABLE E

Benzoyl peroxide
Cumene hydroperoxide
Tertiary butyl hydroperoxide
Tertiary butyl perbenzoate
p-Menthane hydroperoxide
Diisopropyl benzene peroxide
Cyclohexyl hydroperoxide
Acetyl peroxide
Methyl isobutyl ketone peroxide
Lauroyl peroxide These may be assisted in their action by additions of soluble salts of well-known drier metals, such as cobalt, lead, manganese nickel or other promoters of free radical formation. The naphthenates, linoleates and such like salts which are soluble in the polyesters and are catalysts of drying in unsaturated glyceride oils are useful. These, in small but effective amounts, may be employed to enhance the action of the peroxides or hydroperoxides.

The free radical polymerization initiators such as the peroxides or hydroperoxides as above described, are usually employed in an amount within the range of about 0.01 to 5.0 percent by weight based upon the interpolymerizable mixture. Amounts of approximately 0.1 to 3.0 percent by weight of the free radical initiator have been found to be especially effective.

The interpolymerizable mixtures of polyesters possessing an alpha-beta ethylenic group and the monomers containing a $>C=CH_2$ group and containing inhibitors of gelation and usually a free radical catalyst, as well as a mixture of a salicylic acid ester and a hydroxy substituted phenone compound are liquids, and, therefore, can readily be poured into molds, where they can be cured by heat to provide clear unstained castings and sheets. It is thus possible to provide objects of art, e. g., figurines, ornaments or the like which withstand aging remarkably well. The interpolymerizable mixtures may also be used as embeddiment media for protectively embedding flowers, biological specimens, keep-sakes and numerous other articles. Still other uses involve the casting of thin transparent sheets in planar or curvalinear form useful for glazing purposes such as in automobiles, trains, boats, airplanes and the like. Needless to say, if clarity and/or transparency is not a requisite of the bodies, the interpolymerizable mixture may include various dyes, pigments, fillers and the like. The resistance to discoloration characterizing the resin compositions of this invention, is an advantage in such opaque bodies, since it assists in bringing out and maintaining the tints of the coloring agents.

The foregoing interpolymerizable mixtures containing a salicylic acid ester and a hydroxy substituted phenone compound in appropriate amounts to inhibit or retard discoloration upon aging may also be employed to impregnate fabrics, papers, bats, and preforms of heterogeneously or parallely disposed fibers. Appropriate fibers include glass, asbestos, cotton, wood and many others. Sheets of fibrous materials appropriately impregnated or coated with the interpolymerizable mixtures may be laid up to form laminates. The reinforced sheets and laminates thus formed are useful as instrument panels in the construction of automobiles, airplanes, boats or for the construction of table tops and many other articles, either decorative and/or utilitarian, in which color stability is desirable.

The mixtures in molds, or on fabrics or fibrous sheets or supported in any other convenient way, may be caused to undergo rapid interpolymerization, or curing by the application of relatively mild heat, for example, a temperature of about 75° C. to 150° C. In most instances, temperatures of about 90° C. to 100° C. are quite effective in producing gelling and ultimate curing of the mixtures to a hard, resinous state.

The time required for curing, of course, will depend on various factors such as the reactivity of the polyester-monomer mixture, the activity of the catalyst or free radical polymerization initiator, the gelation inhibitor and the amount thereof, the temperature of interpolymerization and the thickness of the body which is to be formed. Usually the cures can be effected within a period of a few minutes, e. g., 2 or 3 minutes. Seldom, if ever, will the cure require longer than about 1 or 2 hours. If desired, the mixtures or bodies containing the mixtures can be cured in two stages. In the first stage, cure is effected with, or without a mold, as may be required and at a moderate temperature, e. g., 90° C. to 100° C. to provide a solid body of sufficient rigidity to be self-supporting. This body is ultimately hardened to a more advanced stage or cure by a baking operation with, or without a mold and in an oven at a temperature of about 125° C. to 150° C. This baking operation is continued until a desired degree of hardness is attained as can readily be ascertained by conventional hardness tests. Usually the baking schedule will be completed within 5 or 10 minutes to about 2 hours depending upon the size of the article to be finished, the hardness desired, and other factors.

Most usually, the cure of the interpolymerizable mixture is effected by the application of heat as above described. However, the invention also includes curing by irradiation with ultra-violet light. This mode of curing is practicable where the interpolymerizable mixture is contained in a transparent mold or where a surface thereof is exposed so that light can gain access to the plastic. This mode of curing is applicable where thin sheets are cured in an appropriate cell such as one formed of a pair of spaced transparent sheets of glass or plastic material. The invention further includes conducting a preliminary curing operation as above described upon an interpolymerizable mixture appropriately contained or supported until the mixture becomes sufficiently hard to be self-supporting and then, at this stage subjecting the body thus formed, with, or without, a molding surface to confine the same, to a baking operation as previously described.

For purposes of measuring the capacity of the mixtures of salicylic acid esters and hydroxy substituted phenones as inhibitors of discoloration, a number of panels comprising a polyester, such as one from Table A, a monomer such as one from Table C and an inhibitor pair were prepared and subjected to tests. In conducting the tests to determine the relative resistance to discoloration cured panels were partially masked to provide on one end an exposed portion and upon the other end a protected portion with which the exposed portion could be compared for purposes of determining the degree of yellowing or discoloration occasioned by the irradiation. The test bodies were exposed to high intensity ultra-violet light from a conventional arc source in a so-called "Weather-O-Meter." The relative degree of weathering between the various samples was determined visually. Examples illustrating these tests are as follows:

Example I

In this example the polyester component comprised a reaction product of equal moles of maleic acid and phthalic acid esterified with a slight (about 10 percent) excess of propylene glycol. The polyester was treated with 0.1 percent of triphenyl phosphite to complex (sequester) any active dissolved metals such as iron, chromium, etc.

The polyester was stabilized with 0.1 percent by weight of trimethyl benzyl ammonium chloride based upon the total resin and 0.0025 percent of quinone based upon total resin. The stabilized polyester while hot was made up with styrene to provide a mixture comprising approximately 72 percent of polyester and 28 percent of styrene.

SAMPLE 1

To a sample of the above mixture, was added 2.0 percent by weight based upon the mixture, of the phenyl ester of salicylic acid and as a free radical polymerization initiator 1 percent upon a like basis, of benzoyl peroxide. The catalyzed mixture was poured into a mold designed for casting sheets and was cured at 170° F. until a solid resinous product was obtained. The sheet was further baked at 220° F. until the surface was hard and mar resistant. The resultant product was transparent and was well adapted for use as windows or canopies for airplanes and for similar purposes. For purposes of determining the resistance of the sheet to discoloration upon exposure to ultra-violet light, the sheet was placed in a "Weather-O-Meter" where it was exposed to intensive ultra-violet irradiation for 500 hours.

SAMPLE 2

A second sample was then prepared in the same manner as Sample 1 except that the phenyl ester of salicylic acid was replaced by 0.1 percent by weight, based upon the mixture, of 2,4-dihydroxy benzophenone, one of the more successful inhibitors of discoloration which has heretofore been suggested. The resultant solution was poured into a mold and cured as outlined for Sample 1 preceding, to provide a second sheet which was then subjected to ultra-violet irradiation in the same manner as the first sheet.

The foregoing two sheets constituted controls. In these sheets the inhibitors of discoloration, namely the phenyl ester of salicylic acid and the 2,4-dihydroxy benzophenone, were employed singly and in quantities which were as nearly as could be determined maximum for the particular resin. The addition of further amounts of either of these inhibitors either did not appreciably retard discoloration in the aging test or else they actually produced increased discoloration, at least during the preliminary stages of aging.

SAMPLE 3

In accordance with the principles of this invention, a third sheet was then prepared employing the same procedures above outlined except that the inhibitor of discoloration in this instance comprised a mixture of 2.0 percent by weight based upon the mixture of the phenyl ester of salicylic acid and 0.1 percent by weight upon a like basis of 2,4-dihydroxy benzophenone. As above indicated, the quantities of these two latter ingredients were approximately the maximum amounts which as single compounds, could be employed without deterioration of the color of the sheet, or which would have an appreciable effect upon the retardation of the discoloring action. This sheet was then aged in the Weather-O-Meter in the manner previously described for Samples 1 and 2.

The three sheets were compared visually. The sheet containing the combination of the two inhibitors of discoloration was definitely superior in color to either of the control sheets. The relative degrees of discoloration could be rated according to the following scale:

Sample 1 _____ 1
Sample 2 _____ 13
Sample 3 _____ 20

Example II

The interpolymerizable mixture of a polyester of equal moles of maleic acid and phthalic acid with propylene glycol described in Example I was employed in this example. The mixture was stabilized with trimethylbenzyl ammonium chloride and hydroquinone as in the former example. A series of samples was then made up and tested as follows:

SAMPLE 1

The liquid interpolymerizable mixture was treated with 0.5 percent of the phenyl ester of salicylic acid and 0.5 percent by weight based upon the mixture, of o-hydroxy acetophenone. The mixture was catalyzed with 1 percent of benzoyl peroxide.

Castings of this mixture were prepared as in the preceding example and the resultant sheets upon exposure to irradiation in the Weather-O-Meter, were found to be highly resistant to discoloration. The sheets were clear and obviously were well adapted for use in the glazing of airplanes, automobiles or for any other purpose where clarity and/or resistance to discoloration upon aging are desirable properties.

SAMPLE 2

Sheet 2 was the same as sheet 1, but with 1 percent by weight based upon the mixture of the phenyl salicylate and 1 percent by weight upon a like basis of o-hydroxy acetophenone.

SAMPLE 3

This sheet was the same as sheet 1, but with 0.2 percent of each of the foregoing inhibitors of discoloration.

Each of the three sheets was of relatively high resistance to discoloration upon aging, though the resistance did not appear to be so great in sheets 2 and 3 as in sheet 1. The inhibitor proportions for the particular mixture were near optimum in sheet 1.

SAMPLE 4

A further sheet of the same composition as above described except that 1 percent by weight based upon the interpolymerizable mixture, of o-hydroxy acetophenone was employed as the inhibitor of discoloration. This product was found to be substantially less resistant to discoloration than any of the other sheets in this example, showing that the mixture of inhibitors was superior to o-hydroxy acetophenone used singly, even when the total amount of said mixture was equal to or even less than the o-hydroxy acetophenone.

Example III

In this example a polyester which comprised 1.0 mole maleic acid, 1.5 moles phthalic acid and 2.8 moles of propylene glycol was employed. The polyester was mixed with styrene in such proportions as to obtain a mixture of 72 percent of the polyester and 28 percent of the styrene. This mixture was stabilized against premature gelation by means of 0.01 percent by weight, based upon the polyesters, of hydroquinone. The mixture was catalyzed with 1.0 percent of benzoyl peroxide by weight based upon the mixture. The inhibitor of discoloration was a combination of 0.5 percent by weight (based upon total mixture) of 2,4-dihydroxy benzophenone and 1.0 percent by weight (same basis) of the phenyl ester of salicylic acid. This mixture was put into an appropriate mold comprising sheets of glass with suitable spacers between them and the mixture was cured as in Example I to provide a clear hard sheet which was exposed to accelerated aging in the Weather-O-Meter for 500 hours. This product was well designed for use as a glazing medium for airplanes and for many other applications.

A second sheet similar to the last mentioned one was also formed but in this instance the mixture of inhibitors of discoloration were employed in the proportion:

Phenyl salicylate—0.5% by weight upon total mixture
2,4-dihydroxy benzophenone—0.05% by weight upon total mixture The product though still useful, obviously was not so resistant to discoloration by ultra-violet light as was the first sheet in this example, thus demonstrating that the proportions of the inhibitors of discoloration though practicable, were definitely below the optimum.

*Example IV*

In this example, the same polyester-styrene mixture specified in Example I was employed. The inhibitor of gelation comprised 0.015 percent by weight based upon the polyester of 3-iospropyl catechol. The mixture was catalyzed with 1.0 percent by weight based upon the total mixture of benzoyl peroxide and a mixture of 1.0 percent by weight upon a like basis of phenyl salicylate and 0.2 percent by weight (same basis) of 2,4-dihydroxy benzophenone. The mixture was a liquid and was introduced into a mold and cured as in Example I. The product was exposed to artificial aging in the Weather-O-Meter for 200 hours and at the conclusion of that time was found to be quite clear. This was one of the best products obtained and obviously is well designed for commercial applications in the glazing art where such properties as light-weight, high clarity and a good strength are desirable.

*Example V*

This example involved the use of the same interpolymerizable mixture specified in Example I. The gelation inhibitor comprised a mixture of 0.1 percent based upon the polyester of trimethylbenzyl ammonium chloride and 0.025 percent by weight (based upon the mixture) of hydroquinone. To the liquid mixture was added 1.0 percent (based upon the mixture) of cumene hydroperoxide which is a recognized free radical polymerization initiator type of catalyst. The inhibitor of discoloration in this instance comprised 0.2 percent by weight (based upon the mixture) of 2,4-dihydroxy benzophenone and 1.0 percent upon a like basis of phenyl salicylate. This mixture was cured as in the preceding examples to provide a sheet which was adapted for accelerated aging in the Weather-O-Meter. The sheet was so weathered for 500 hours and at the conclusion of that time it was observed that the color was inferior to that of the products of the preceding examples. It is apparent that under some conditions, catalysts such as cumene hydroperoxide have some adverse effect on color of the product.

It will be apparent to those skilled in the art that the examples as given in the invention are by way of illustration only; obviously, numerous modifications may be made therein without departure from the spirit of the invention or the scope of the appended claims.

I claim:

1. A hard, resinous product characterized by outstanding resistance to the harmful effects of light, comprising an interpolymer of (A) a polyester of a dihydric alcohol and an alpha, beta-ethylenically unsaturated dicarboxylic acid, and (B) a monomer containing a $CH_2=C<$ group, said interpolymer having incorporated therein (1) an ester of salicylic acid wherein the salicylic acid is esterified through the carboxyl group and (2) a hydroxy substituted phenone in which a hydroxyl group is in the ortho position to the ketonic carbonyl group of the phenone.

2. The hard, resinous product of claim 1 wherein the resinous (A) polyester is of a dihydric alcohol and a mixture of an alpha, beta-ethylenically unsaturated dicarboxylic acid and a dicarboxylic acid devoid of aliphatic carbon-to-carbon unsaturation, and the (1) ester of salicylic acid is phenyl salicylate.

3. The hard, resinous product of claim 2 wherein the hydroxy substituted phenone is a member selected from the group consisting of orthohydroxyacetophenone, 2,4-dihydroxybenzophenone, 2,2'-dihydroxybenzophenone, and dihydroxyacetophenone.

4. An interpolymerizable mixture of (A) a polyester of a dihydric alcohol and an alpha, beta-ethylenically unsaturated dicarboxylic acid, and (B) a monomer containing a $CH_2=C<$ group, said interpolymerizable mixture having incorporated therein (1) an ester of salicylic acid wherein the salicylic acid is esterified through the carboxyl group, and (2) a hydroxy substituted phenone in which a hydroxyl group is in the ortho position to the ketonic carbonyl group of the phenone.

5. The interpolymerizable mixture of claim 4 wherein the (A) polyester is of a dihydric alcohol and a mixture of an alpha, beta-ethylenically unsaturated dicarboxylic acid and a dicarboxylic acid devoid of aliphatic carbon-to-carbon unsaturation and the (1) ester of salicylic acid is phenyl salicylate.

6. The interpolymerizable mixture of claim 5, wherein the hydroxy substituted phenone is a member selected from the group consisting of orthohydroxyacetophenone, 2,4-dihydroxybenzophenone, 2,2'-dihydroxybenzophenone, and dihydroxyacetophenone.

References Cited in the file of this patent

UNITED STATES PATENTS

| Number | Name | Date |
|---|---|---|
| 2,304,466 | Matheson | Dec. 8, 1942 |
| 2,407,051 | Adelson et al. | Sept. 3, 1946 |
| 2,568,894 | Mackey | Sept. 25, 1951 |
| 2,593,787 | Parker | Apr. 22, 1952 |
| 2,617,748 | Bjorksten et al. | Nov. 11, 1952 |
| 2,635,089 | Anderson | Apr. 14, 1953 |